US012752303B2

(12) United States Patent
Juutinen

(10) Patent No.: US 12,752,303 B2
(45) Date of Patent: Oct. 6, 2026

(54) SCREEN ATTACHMENT SYSTEM

(71) Applicant: Metso Finland Oy, Espoo (FI)

(72) Inventor: Tuomas Juutinen, Tampere (FI)

(73) Assignee: Metso Finland Oy, Espoo (FI)

( * ) Notice: Subject to any disclaimer, the term of this patent is extended or adjusted under 35 U.S.C. 154(b) by 353 days.

(21) Appl. No.: 18/245,315

(22) PCT Filed: Sep. 20, 2021

(86) PCT No.: PCT/FI2021/050618
§ 371 (c)(1),
(2) Date: Mar. 14, 2023

(87) PCT Pub. No.: WO2022/064102
PCT Pub. Date: Mar. 31, 2022

(65) Prior Publication Data

US 2023/0356262 A1 Nov. 9, 2023

(30) Foreign Application Priority Data

Sep. 22, 2020 (FI) ..................................... 20205915

(51) Int. Cl.
*B07B 1/00* (2006.01)
*B02C 21/02* (2006.01)
(Continued)

(52) U.S. Cl.
CPC ............ *B07B 1/005* (2013.01); *B02C 21/026* (2013.01); *B02C 23/10* (2013.01); *B07B 13/16* (2013.01)

(58) Field of Classification Search
CPC ....... B07B 1/005; B07B 13/16; B02C 21/026; B02C 23/10
See application file for complete search history.

(56) References Cited

U.S. PATENT DOCUMENTS 6,405,874 B1 * 6/2002 Douglas .................. B02C 21/02 209/244
6,877,610 B2 * 4/2005 Boast ........................ B07B 1/46 209/412

(Continued)

FOREIGN PATENT DOCUMENTS

CN 104190619 A 12/2014
CN 105579144 A 5/2016

(Continued)

OTHER PUBLICATIONS

Search Report for priority Finnish Patent Application No. 20205915, dated Mar. 3, 2021.

(Continued)

*Primary Examiner* — Joseph C Rodriguez
(74) *Attorney, Agent, or Firm* — Andrus Intellectual Property Law, LLP

(57) ABSTRACT

A mobile mineral material processing plant is adaptively coupled to a screen module using an elongated coupling base that has first and second adapters to respectively detachably attach together a screen module, one or more exit conveyors and to detachably attach the screen module and the one or more exit conveyors to the plant. The first adapter pivotably couples to the plant on laterally moving the plant to engage with a first connector of the first adapter. The second adapter allows an actuator to lift the screen module with the coupling base so that the screen module pivots from ground about the pivotable coupling to an inclined operating configuration. The coupling base is angled to horizontally align a reject conveyor in the inclined operating configuration.

19 Claims, 3 Drawing Sheets

(51) Int. Cl.
*B02C 23/10* (2006.01)
*B07B 13/16* (2006.01)

(56) References Cited

U.S. PATENT DOCUMENTS

| | | | | |
|---|---|---|---|---|
| 11,033,933 | B2 * | 6/2021 | Rafferty | B07B 13/16 |
| 11,247,237 | B2 * | 2/2022 | Rafferty | B07B 13/16 |
| 11,305,317 | B2 * | 4/2022 | Belosevic | B07B 1/005 |
| 11,369,997 | B2 * | 6/2022 | Juutinen | B07B 1/005 |
| 11,376,631 | B2 * | 7/2022 | Kykyri | B07B 1/005 |
| 11,511,319 | B2 * | 11/2022 | Mcdevitt | B07B 1/005 |
| 11,858,004 | B2 * | 1/2024 | Leinonen | B07B 1/005 |
| 11,865,582 | B2 * | 1/2024 | Rafferty | B07B 13/07 |
| 2003/0146315 | A1 * | 8/2003 | Boast | B07B 13/16 241/34 |
| 2007/0205313 | A1 | 9/2007 | Yagura et al. | |
| 2013/0037454 | A1 * | 2/2013 | Schirm | B07B 13/16 209/404 |
| 2016/0184832 | A1 * | 6/2016 | Salminen | B02C 23/08 241/101.5 |
| 2021/0101181 | A1 * | 4/2021 | Belosevic | B07B 1/005 |
| 2023/0356262 | A1 * | 11/2023 | Juutinen | B02C 21/02 |

FOREIGN PATENT DOCUMENTS

| | | | |
|---|---|---|---|
| EP | 2359944 | A1 | 8/2011 |
| EP | 3482836 | A1 | 5/2019 |
| WO | 2006051165 | A1 | 5/2006 |
| WO | 2007093645 | A2 | 8/2007 |
| WO | 2016050326 | A1 | 4/2016 |
| WO | 2019215387 | A1 | 11/2019 |

OTHER PUBLICATIONS

International Search Report and Written Opinion for PCT/FI2021/050618, mailed Nov. 25, 2021.
International Preliminary Report on Patentability for PCT/FI2021/050618, mailed Nov. 25, 2022.
Post-grant opposition brief and alleged prior art against Finnish Application No. 20205915 dated Mar. 11, 2022.
Search Report and Examination Opinion for Chinese Patent Application No. 202180064026.0, dated Jun. 9, 2025.
Office Action for Japanese Patent Application No. 2023-517253, dated Jul. 3, 2025.

* cited by examiner

SCREEN ATTACHMENT SYSTEM

CROSS-REFERENCE TO RELATED APPLICATIONS

This application is the U.S. national stage application of International Application PCT/FI2021/050618, filed Sep. 20, 2021, which international application was published on Mar. 31, 2022, as International Publication WO 2022/064102 A1 in the English language. The International Application claims priority of Finnish Patent Application No. 20205915 filed Sep. 22, 2020.

TECHNICAL FIELD

The present disclosure generally relates to a screen attachment system. In particular, though not exclusively, the present disclosure relates to a screen attachment system of a mobile mineral material processing plant.

BACKGROUND

This section illustrates useful background information without admission of any technique described herein representative of the state of the art.

Screens of different models are supplied for use in different mobile mineral material processing plants. In order to attach a given screen model with a given mineral material processing plant, particular mounting work may be required. Therefore, attaching a desired screen model to a currently used mineral material processing plant model may require plenty of time and work.

US 2003/0146315 A1 discloses a screen assembly and WO 2006/051165 A1 discloses a frame of a movable processing device of mineral materials and a multi-purpose fastening device.

SUMMARY

It is desired to facilitate equipping of mineral material processing plants with different screens.

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a system for equipping a mobile mineral material processing plant with a screen module, comprising:

- an elongated coupling base having in longitudinal direction a first end and a second end, the coupling base comprising:
  - at the first end, a first adapter that is detachably attachable to the screen module and configured to detachably attach the coupling base with a pivotal attachment to the mineral material processing plant at a mounting orientation;
  - spaced apart of the first end, a second adapter that is detachably attachable to the screen module and configured to detachably attach to the coupling base and to form an actuator attachment with the mineral material processing plant for lifting the screen module about the pivotal attachment to a use orientation; and
  - a second conveyor base longitudinally following the first conveyor base, for supporting a second exit conveyor;
- wherein the first and second conveyor bases define planes differing by a vertical angle;
- wherein the first adapter comprises a first connector for coupling with a first connector counterpart of the mineral material processing plant;
- wherein the first connector is configured to allow coupling the screen module with the mineral material processing plant by laterally moving the mineral material processing plant to engage with the first connector by the first connector counterpart.

Attaching the screen module to the mineral material processing plant may be simplified by allowing coupling the screen module with the mineral material processing plant by laterally moving the mineral material processing plant to engage with the screen module.

The system may comprise different or adaptive first adapters for two or more different screen modules of different sizes or shapes. The first adapters may be configured to attach to a standard beam of the frame of the screen module by form and/or friction locking.

The system may comprise different or adaptive second adapters for two or more different screen modules of different sizes or shapes. The second adapters may be configured to attach to a standard beam of the frame of the screen module by form and/or friction locking.

With the different or adaptive first and/or second adapters, the system may facilitate attaching screen modules of different models to the mineral material processing plant.

With form and/or friction locking of the first and/or second adapters, the screen module may be attachable to frames of screen modules of different manufacturers without deteriorating strength of the fame, e.g., by welding or drilling.

The second adapter may comprise a second connector. The frame of the mobile mineral material processing plant may comprise a second counterpart. The second connector may be configured to allow locking the coupling when the second counterpart engages with the second connector. The second connector may be configured to automatically lock the coupling when the second counterpart engages with the second connector.

The locking may secure the coupling to avoid accidental or malicious uncoupling of the screen module from the mineral material processing plant. By automatically locking the coupling, the locking can be made more reliable and/or manual operations can be reduced.

The screen module may comprise a first end. The first adapter may be configured to support the first end. The second adapter may be configured to allow lifting a second end of the screen module. The second end of the screen module may reside opposite to the first end of the screen module.

The first adapter may comprise a first connector configured to couple with a first counterpart of the frame of the mineral material processing plant. The first connector may be configured to enable a guided coupling. The first connector itself may comprise a guiding connector. The guiding connector may comprise a slide in connector. The slide in connector may comprise an outwards opening guide configured to receive connector receptacle. Alternatively, the slide in connector may comprise a connector receptacle for entering into an outwards opening guide. The outwards opening guide may open in vertical direction. Alternatively, or additionally, the outwards opening guide may open in a horizontal direction.

The outwards opening guide may facilitate aligning the guide and the receptacle so facilitating the equipping of the mineral material processing plant with the screen module.

The system may further comprise a screen module ground support. The screen module ground support may allow freely placing the screen module onto ground without preparing a platform for the screen module.

The screen module ground support may be configured to attach to the frame of the screen module.

The screen module ground support may be configured to align the first connector with a first counterpart in the mineral material processing plant. In this case, the screen module may be coupled by moving the mineral material processing plant. Thanks to the aligning, the first connector may then couple with the first counterpart while the screen module rests on ground by the screen module ground support. A need for jacking or lifting equipment or use of a ramp or ramps or other temporary structures may be avoided. The coupling may be done by a single person.

By simplifying the coupling of the screen module with the mobile mineral material processing plant, switching of screen modules may also be made practical so that, for example, screening can be more efficiently adapted to variations in input mineral material or in required screening products.

The frame of the screen module may comprise a first sub-frame configured to support the screen and a second sub-frame configured to support a second conveyor below the screen. The frame of the screen module may comprise one or more interlinks configured to detachably couple the first sub-frame and the second sub-frame. The one or more interlinks may comprise an actuator holder that is configured to attach to the first sub-frame and to the second sub-frame. The interlinks alone may prevent separating the first and second sub-frames.

The screen module ground support may comprise a link member attached to the first sub-frame or to the second sub-frame. The screen module ground support may comprise a separable part that is detachably attachable to the link member. The link member may be formed of a tubular part.

The separable part may comprise one or more first rest members for resting a first section of the screen module against the ground. The first rest member may comprise a first body configured to support the frame to the ground. The first body may comprise a tubular member such as a pipe. The first section may reside closer to the first end of the screen module than to the second end of the screen module.

The separable part may comprise one or more second rest members for resting a second section of the screen module against the ground. The second rest member may comprise a second body configured to support the frame to the ground. The second body may comprise a tubular member such as a pipe. The second section may reside closer to the second end of the screen module than to the first end of the screen module.

The first rest members and the second rest members may be releasably attachable to the coupling base. The releasable attachability to the coupling base may enable releasable attaching of the first rest members and the second members to screen modules of different sizes at different spacing. The first and second rest members may be configured to define a footprint surrounding a mass center of the screen module so as to make the screen module ground support stable when not coupled with the mineral material processing plant.

The separable part may comprise ground plates configured to abut ground. The ground plates may be integrally formed with or assembled as permanent parts of the first and second rest members. The ground plates may be equipped with slot-in members configured to connect with the first body or with the second body.

The slot-in members may enable fast and simple attaching of the ground plates to the screen module ground support. The system may comprise a transport bracket comprising slot-in members configured to fit into the first body and into the second body. The transport bracket may be configured to act as loading rails for loading the screen onto a transport platform. The transport platform may be on a lorry or a truck.

According to a second example aspect there is provided a mobile mineral material processing plant comprising the system of the first example aspect for equipping the mobile mineral material processing plant with a screen module.

According to a third example aspect there is provided a coupling system comprising:

an elongated coupling base comprising first and second adapters configured to respectively detachably attach together a screen module, one or more exit conveyors and to detachably attach the screen module and the one or more exit conveyors to a mobile mineral material processing plant;

wherein the first adapter is configured to pivotably couple to the mineral material processing plant on laterally moving the mineral material processing plant to engage with a first connector of the first adapter; and the second adapter is configured to allow an actuator to lift the screen module with the coupling base so that the screen module pivots from ground about the pivotable coupling to an inclined operating configuration.

The coupling base may be angled to horizontally align a reject conveyor in the inclined operating configuration Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Various embodiments have been presented. It should be appreciated that in this document, words comprise, include, and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

Figure 1:
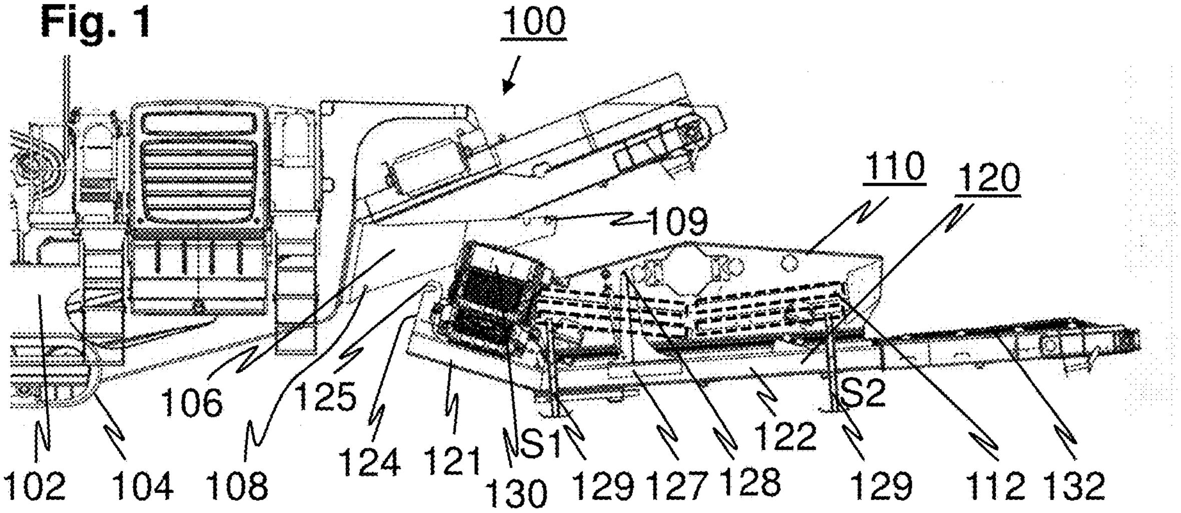
FIG. 1 shows a side view of an example embodiment of a mobile mineral material processing plant.

FIG. 1 shows system comprising a mobile mineral material processing plant 100; a screen module 110; and a coupling base 120 for supporting and coupling the screen module with the mobile mineral material processing plant, and for supporting and coupling exit conveyors, such as a first exit conveyor 130 and a second exit conveyor 132.

The mobile mineral material processing plant 100 comprises a frame 102, tracks 104 for self-propelling, a body arm 106 formed by the frame, a first connector counterpart 108 and a second connector counterpart 109. The first connector counterpart 108 is, for example, a shaft attached to the frame 102. The second connector counterpart 109 is, for example, a recess or vertical groove formed on to a top surface of a body arm 106. The body arm 106 may be configured to suspend the screen module 110 with the second connector counterpart 109 at a lateral distance from the first connector counterpart 108.

The screen module 110 comprises a plurality of screens 112.

The coupling base 120 comprises a first conveyor base 121 extending over a first length from the first end, for supporting the first exit conveyor 130, and a second conveyor base 122 longitudinally following the first conveyor base 121, for supporting the second exit conveyor 132. The coupling base 120 further comprises a first adapter 124 and in the first adapter 124, a first connector 125 for coupling with the first connector counterpart 108. The first adapter 124 is detachably attachable to the first conveyor base 121. In an alternative embodiment, the first adapter partly or entirely forms the first conveyor base 121.

The coupling base 120 further comprises a second adapter 127 that has a second connector 128 for coupling with the second connector counterpart 109. In an embodiment, the coupling base 120 further comprises a plurality of legs 129 for supporting the screen module 110 free-standing on ground by the coupling base 120 at a first section S1 closer to a first end of the screen module 110 and at a second section S2.

In FIG. 1, a dashed line indicates two screen decks each comprising two screens. In other embodiments, there may be only one screen deck formed of one or more screens, or there may be more screen decks as well.

Figure 2:
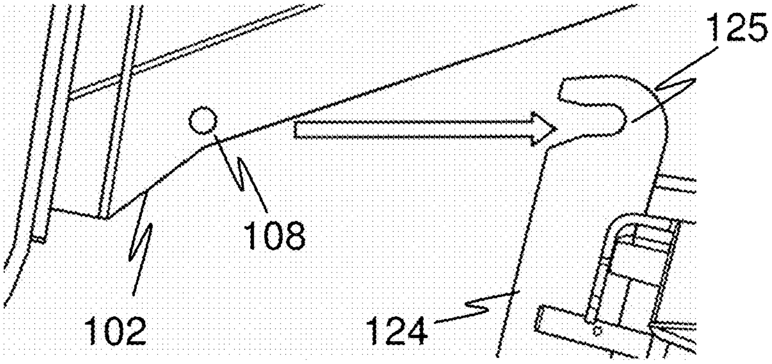
FIG. 2 shows a more detailed view of a portion of FIG. 1.
Figure 3:
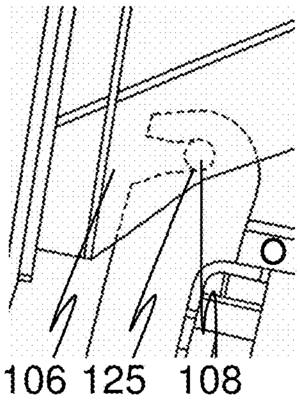
FIG. 3 shows a more detailed view of a portion of FIG. 1 when the mobile mineral material processing plant and the screen module are coupled together.

FIG. 2 shows a more detailed view of a portion of FIG. 1. FIG. 3 shows a more detailed view of a portion of FIG. 1 when the mobile mineral material processing plant 100 and the screen module 110 are coupled together using the coupling base 120. FIGS. 2 and 3 illustrate that how, on moving (e.g., by driving or towing) the mobile mineral material processing plant 100, the first connector 125 and the first connector counterpart 108 engage with each other. FIGS. 2 and 3 also show that the first connector 125 has a tapered mouth that opens outwards so as to facilitate coupling.

It shall be appreciated that the implementation of the coupling is freely modifiable: for example, one of the two coupling parts may have a ball or barrel surface. Likewise, a guiding shape for facilitating the coupling may be comprised by either or both sides of the coupling. Moreover, whereas two or more first connectors 125 and first connector counterparts 108 may be provided, in an embodiment there is only one first connector and first connector counterpart 108 so that the screen module can be suspended from three points.

Figure 4:
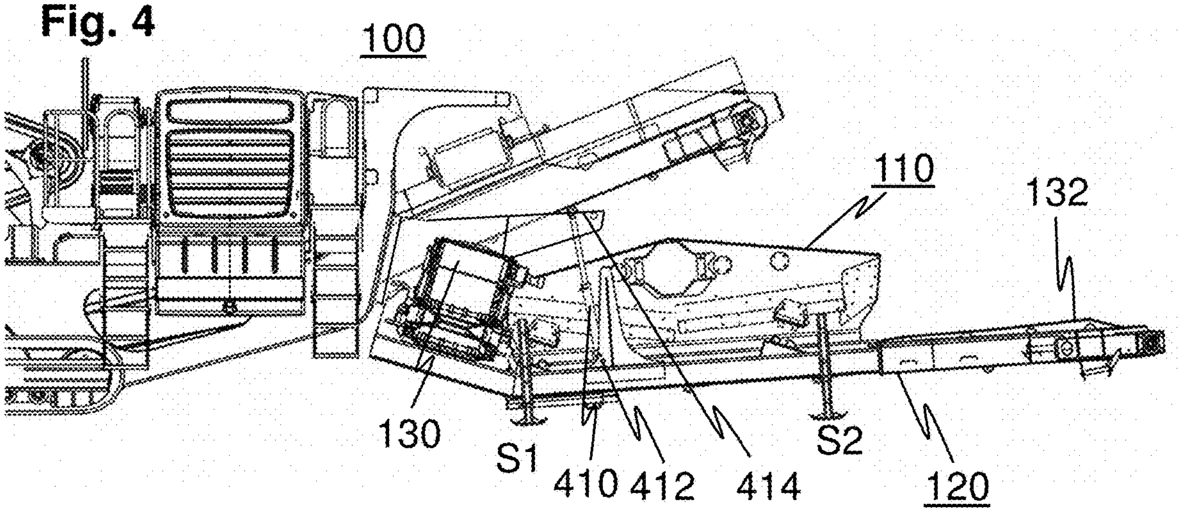
FIG. 4 shows a side view of the mobile mineral material processing plant and the screen module when coupled together.

FIG. 4 shows a side view of the mobile mineral material processing plant and the screen module when coupled together. In this configuration, the first connector counterpart 108 is coupled with the first connector 125 with a pivotal attachment so that the screen module 110 could be lifted upwards by pivoting about the first connector 125.

The system of FIG. 4 further comprises an actuator 410 having a first end 412 for coupling with the second adapter 127, and a second end 414 for coupling with the frame 102, or more precisely, the body arm 106, of the mobile mineral material processing plant 100. The actuator 410 is, for example, a hydraulic actuator. The actuator 410 may receive its power from the screen module 110 or from the mobile mineral material processing plant 100. In an embodiment, the actuator is kept pivotably connected with the one of the mineral material processing plant 100 and the screen module 110 from which the actuator 410 receives its power. The screen module 110 can be flexibly supported on the coupling base 120 through springs (not shown), for example, so that the screens of the screen module 110 can be vibrated without unduly using energy to vibrate and fatiguing structures of the second conveyor 132. The coupling base 120, the first adapter 124 and the second adapter 127 together form a suspension that suspends the screen module 110 from the mobile mineral material processing plant 100. FIG. 4 further shows a first conveyor 130 comprised by the screen module 110. In FIG. 4, the first conveyor 130 is supported by the coupling base 120 between the screen module 110 and the mobile mineral material processing plant 100.

In an embodiment the mineral material processing plant 100 and the screen module 110 are configured to attach at a mounting orientation. Advantageously, the legs 129 and the first and second connectors 125, 128 and connector counterparts 108, 109 are so positioned that this mounting orientation results when the screen module 110 rests on a level ground by the coupling base 120. In an embodiment, the first connector counter-part 108 is configured to allow coupling the screen module 110 with the mineral material processing plant 100 by driving or towing the mobile mineral material processing plant 100 to engage with a first connector 125 of the screen module 110.

Figure 5:
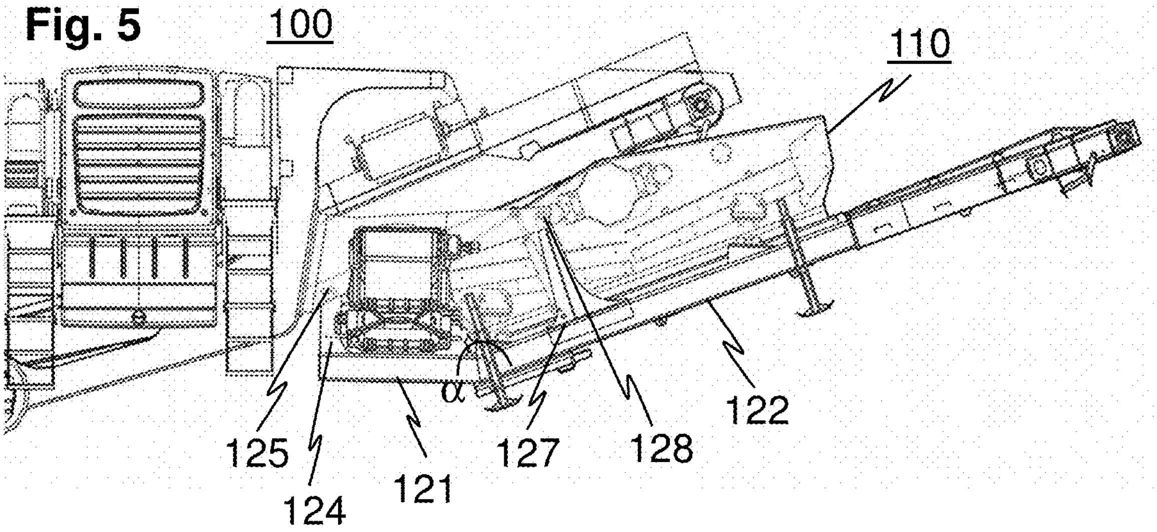
FIG. 5 shows the mobile mineral material processing plant with the screen module in use orientation.

FIG. 5 shows the mobile mineral material processing plant 100 with the screen module 110 in use orientation in which the screen module 110 has been coupled with the mobile mineral material processing plant 100 using the coupling base, pivoted up about the first connector 125 using the actuator 410 and locked in place by the second connector 128.

The first conveyor base 121 and the second conveyor base 122 define planes that differ by a vertical angle $\alpha$. The vertical angle $\alpha$ may be such that when the mineral material processing plant 100 is processing mineral material with the screen module 110, the first conveyor base 121 is horizontal when seen in longitudinal direction of the coupling base 120.

Figure 6:
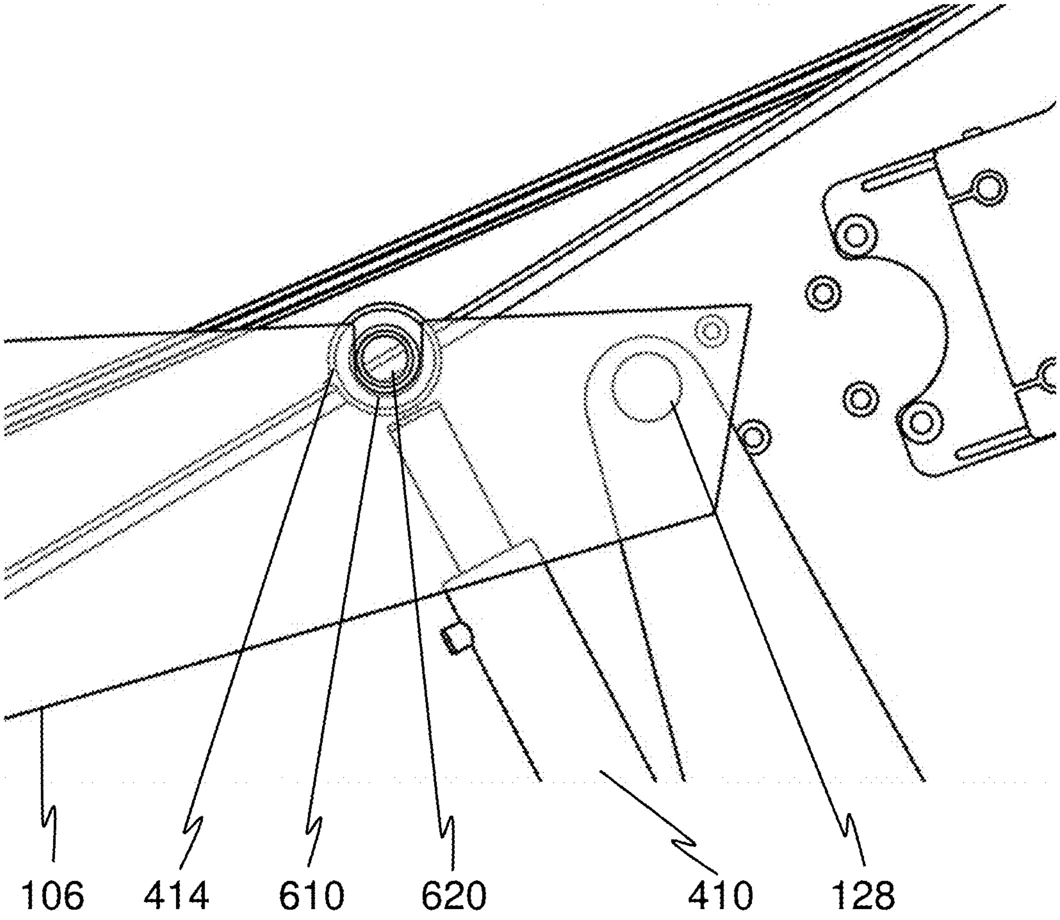
FIG. 6 shows a more detailed view of a portion of FIG. 5.

FIG. 6 shows a more detailed view of a portion of FIG. 5. The second end of the actuator 410 is configured to engage with a receiver 610 arranged to the frame 102 or the body arm 106 of the mineral material processing plant 100. A coupling pin or bushing 620 is inserted through a loop in the second end 414 of the actuator 410 to form an actuator attachment with the receiver 610. This attachment allows lifting the screen module 110 by the coupling base about the pivotal attachment by the actuator 410 to a use orientation as shown in FIG. 5.

In FIG. 6, there are separate and spaced parts for attaching the actuator 410 and for coupling the screen module 110 with the second connector 128. However, in another embodiment these functions are entirely or partly combined. For example, the receiver 610 of FIG. 6 can be doubled as the second connector counterpart 109 to not only receive the second end 414 of the actuator 410 but also the second connector 128. With suitable guiding shapes, the second connector 128 may be made to snap into the receiver 610.

In an embodiment, the second connector 128 is configured to allow locking the coupling. To this end, a locking pin or padlock, for example, can be used. Where the receiver 610 is also used as the second connector counterpart, the locking may be implemented by forming a self-locking form that prevents lowering back. In this case, the locking may be released so that the second connector 128 leaves upwards the receiver 610 by operating the actuator again and an automatic mechanism bypasses the locking, or the locking is manually bypassed. For example, the receiver may be blocked with a suitably shaped bypass object that guides the connector past the receiver. Such a bypass object may be hingedly or slidably connected to the screen module to avoid losing the bypass object and to improve safety. The bypass object may be operated by actuation of the actuator 410 or manually. The locking is configured to secure the coupling to avoid accidental or malicious uncoupling of the screen module 110 or, more accurately, the coupling base 120 carrying the screen module 110, from the mineral material processing plant 100. By automatically locking the coupling, the locking can be made more reliable and/or manual operations can be reduced.

Figure 7:
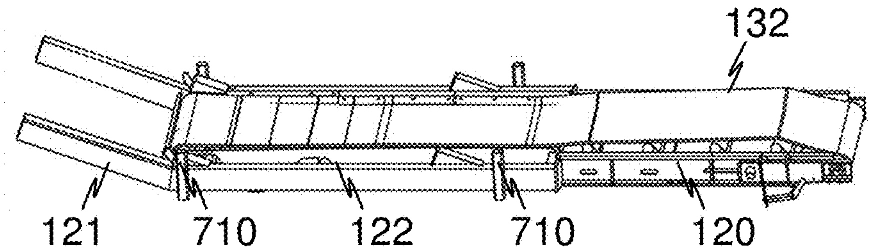
FIG. 7 shows a portion of coupling base and a second conveyor of FIG. 1.

FIG. 7 shows a portion of a coupling base 120 and the second conveyor 132 of FIG. 1. The coupling base 120 comprises two pairs of link members 710 attached therein, e.g., by welding or bolting. The link members 710 are, for example, made of relatively short pieces of pipe or of loops. The link members 710 are configured to receive respectively formed slotting members 920 of a transportation platform 900 shown in FIG. 9 or of legs 129 shown in FIG. 13. The link members also entirely or partially form the first conveyor base 121.

Figure 8:
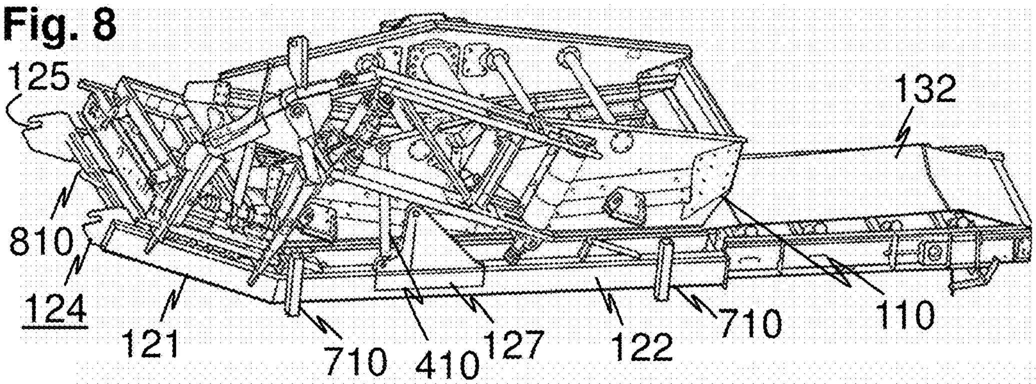
FIG. 8 shows a partial screen module assembly of an example embodiment.

FIG. 8 shows a partial screen module assembly of an example embodiment, and the coupling base 120 including the first adapter 124 with a winching or towing loop 810 and the first connector 125. FIG. 8 shows how the second adapter 127 conveniently attaches together the screen module 410 and the coupling base 120 and supports the actuator 410. FIG. 8 further how the second adapter 127 functions as shows an actuator holder. The actuator folder has, in an embodiment, a slot between two plates that form a body for the second adapter 127. The slot may be formed to have apertures aligned with a loop residing at an end of the actuator 410.

Figure 9:
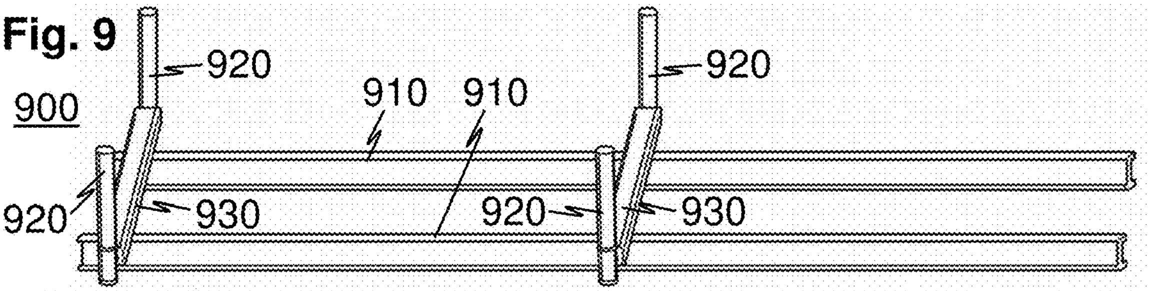
FIG. 9 shows a transport bracket of an example embodiment.

FIG. 9 shows a transport bracket 900 of an example embodiment, as mentioned in connection with FIG. 7 description. Further to the aforementioned slotting members 920, the transport bracket comprises transport beams 910 to enable sliding a supported screen module onto a transport platform and back using a winch that pulls from the winching or towing loop 810. Said loop 810 can also be used to tow the screening module on site with the transport beams 910 acting as sledges. The transport bracket further comprises a cross structure for supporting beams in place, here formed of two cross bars 930. The transport bracket 900 is attachable to the link members 710 simply by lifting the screen module and then lowering so that the link members 710 align and connect with the slotting members 920. In some embodiments, this lifting can be conveniently made using the actuators 410 (preferably at least one on each side). If there is too little space, a small heap of sand or a small mound can be facilitated by driving or towing the mineral material processing apparatus thereon so as to gain more space below. The transport bracket 900 may be locked in place to the screening module, e.g., using pins slotting through aligned holes of the link members 710 and the slotting members 920.

Figure 10:
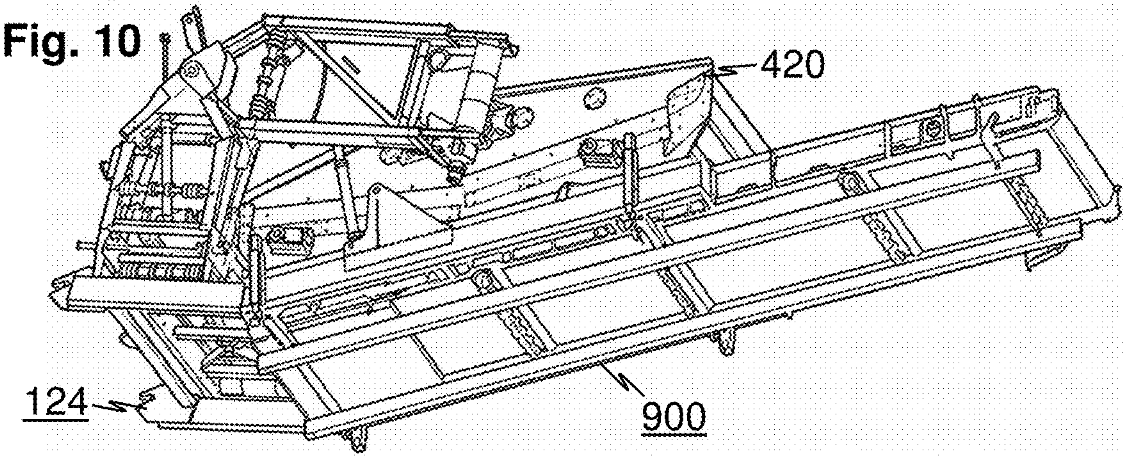
FIG. 10 shows the partial screen module assembly of FIG. 8 combined with the transport bracket of FIG. 9 for transport.

FIG. 10 shows the partial screen module assembly of FIG. 8 when combined with the transport bracket of FIG. 9 for transport.

Figure 11:
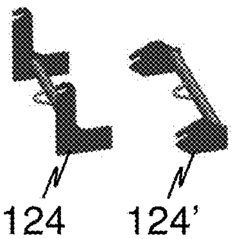
FIG. 11 shows first adapters of two different example embodiments.

FIG. 11 shows first adapters 124, 124' of two different example embodiments for suiting together different screen modules and mobile mineral material processing plants. By forming suitable vertical and horizontal offsets for the first connectors 125 (shown in FIG. 8), desired alignment can be provided for a first end of the screen module.

Figure 12:
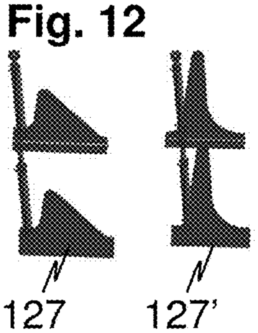
FIG. 12 shows second adapters of two different example embodiments.

FIG. 12 shows second adapters 127, 127' of two different example embodiments. Alike the first adapters 124 and 124' that suite different screen modules and mobile mineral material processing plants by suitably aligning the first end of the screen module, the second adapters 127, 127' enable suitably aligning the second end by supporting the screen module 110 at a desired height relative to the second conveyor 132.

Figure 13:
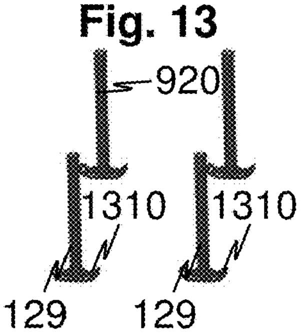
FIG. 13 shows the legs of FIG. 1 mobile mineral material processing plant.

FIG. 13 shows the legs 129 of FIG. 1 mobile mineral material processing plant. FIG. 13 further shows the slotting members 920 and the ground plates 1310.

The invention claimed is:

1. A system for equipping a mobile mineral material processing plant with a screen module, comprising:

an elongated coupling base for supporting the screen module with respect to the mineral material processing plant, the coupling base having in a longitudinal direction a first end and a second end, the coupling base comprising:

a first conveyor base extending over a first length from the first end of the coupling base, wherein the first conveyor base supports a first exit conveyor;

a second conveyor base longitudinally following the first conveyor base and extending over a second length to the second end of the coupling base, wherein the second conveyor base supports a second exit conveyor, wherein the first and the second conveyor bases define the coupling base and extend along planes differing by a vertical angle;

a first adapter located at the first end of the coupling base and configured to detachably attach the screen module to the mobile mineral processing plant such that the coupling base is pivotal relative to the mineral material processing plant to a mounting orientation; and a second adapter located on the second conveyor base and configured to detachably attach the coupling base to the mineral material processing plant, wherein the second adapter includes an actuator operable for lifting the screen module about the pivotal attachment created by the first adapter-to a use orientation;

wherein the first adapter comprises a first connector configured to couple the first adapter to a first connector counterpart of the mineral material processing plant; and wherein the first connector is configured to allow coupling the screen module with the mineral material processing plant by longitudinally moving the mineral material processing plant to engage the first connector counterpart with the first connector.

2. The system of claim 1, further comprising different or adaptive first adapters for two or more different screen modules of different sizes or shapes.

3. The system of claim 1, further comprising different or adaptive second adapters for two or more different screen modules of different sizes or shapes.

4. The system of claim 1, further comprising a transport bracket configured to enable detachably attaching first and second rest members with respective ground support to the conveyor base.

5. The system of claim 4, wherein the transport bracket is configured to provide loading rails for loading the screen module onto a transport platform of a truck or trailer.

6. The system of claim 1, wherein a second connector is configured to allow locking the coupling when the second connector counterpart engages with the second connector.

7. The system of claim 1, further comprising a screen module ground support configured to allow freely placing the screen module onto ground when supported by the coupling base.

8. The system of claim 7, wherein the screen module ground support is configured to detachably attach to the coupling base.

9. The system of claim 7, wherein the screen module ground support is configured to align the first connector with a first connector counterpart in the mineral material processing plant.

10. The system of claim 1, wherein:

the system comprises a separable part that comprises one or more first rest members for resting a first section of the screen module against the ground;

wherein each first rest member comprises a first body configured to support the frame to the ground;

the first section resides closer to the first end of the screen module than to the second end of the screen module;

the separable part comprises one or more second rest members for resting a second section of the screen module against the ground;

wherein each second rest member comprises a second body configured to support the frame to the ground;

the second section resides closer to the second end of the screen module than to the first end of the screen module.

11. A mobile mineral material processing plant comprising:

a crusher; and the system of claim 1; and screen media for the screen module.

12. The mobile mineral material processing plant of claim 11, further comprising the first exit conveyor.

13. The mobile mineral material processing plant of claim 11, further comprising the second exit conveyor.

14. The system of claim 1, wherein the screen module further comprises a first sub-frame configured to support the screen module and a second sub-frame configured to support a second conveyor below the screen module.

15. The system of claim 14, further comprising a screen module ground support comprising a plurality of link members attached to the first sub-frame or to the second sub-frame; and a separable part that is detachably attachable to the link members.

16. The system of claim 15, wherein the separable part further comprises ground plates configured to abut ground.

17. The system of claim 16, wherein the ground plates are equipped with slot-in members configured to connect with the plurality of link members.

18. The system of claim 17, wherein the system further comprises a transport bracket comprising slot-in members configured to fit into the plurality of link member.

19. The system of claim 18, wherein the transport bracket is configured to provide loading rails for loading the screen onto a transport platform.

* * * * *